Jan. 16, 1945. R. L. TRIPLETT 2,367,449
SHOCK MOUNTING INSTRUMENT
Filed March 6, 1942
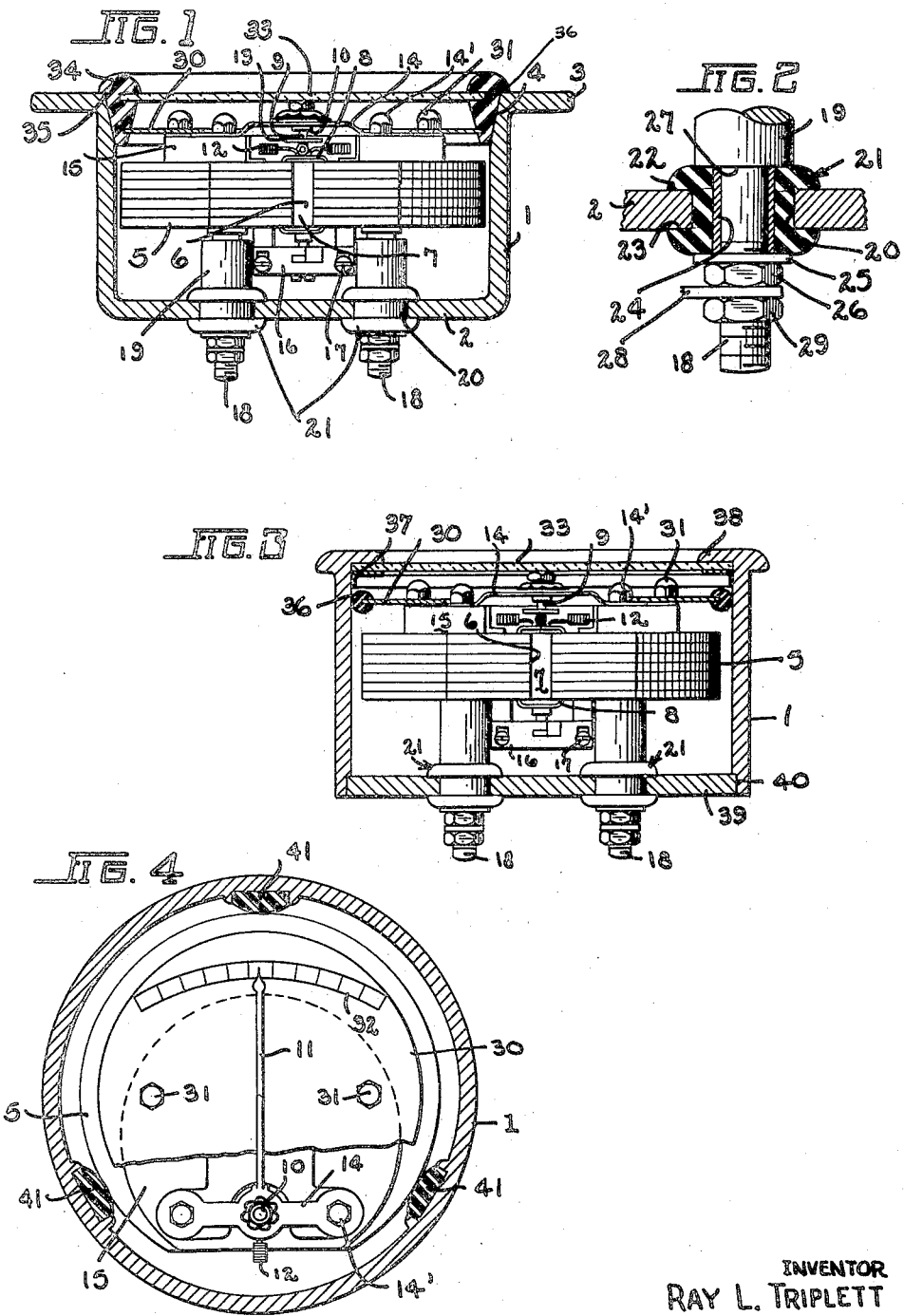
INVENTOR
RAY L. TRIPLETT
Toulmin & Toulmin
ATTORNEYS Patented Jan. 16, 1945

2,367,449

UNITED STATES PATENT OFFICE 2,367,449

SHOCK MOUNTING INSTRUMENT

Ray L. Triplett, Bluffton, Ohio

Application March 6, 1942, Serial No. 433,567

4 Claims. (Cl. 171—34)

The present invention relates to electrical instruments, and more particularly to improved methods and apparatus for mounting an instrument movement within its casing.

The parts of an electrical measuring instrument, more especially those of a small ammeter or voltmeter, are usually of light weight, and the movement is mounted on jewel bearings in order to obtain the necessary sensitiveness. Structure of this character is quite delicate and is apt to be knocked out of adjustment during transportation of the instrument or during use, particularly if the instrument were subjected to jar.

The primary object of the present invention is to provide an electrical measuring instrument which, even though of a sensitive character, may nevertheless be subjected to considerable jar or impact without misaligning the various parts or otherwise causing damage thereto.

Another object is to provide an electrical measuring instrument in which the movement is so mounted within the casing as to be isolated from shock or jar.

The general object of the invention is to provide a small ammeter or voltmeter, in which the movable parts are shock-proof mounted within the casing.

These objects are attained, in brief, by interposing shock-absorbing material between the casing and those parts of the internal structure, including the movement, which contact the casing.

The invention will be better understood when the specification is perused in connection with the accompanying drawing.

In the drawing:

Figure 1 is a vertical sectional view taken through the instrument as improved in accordance with the present invention. The studs which retain the movement in position are shown in elevation.

Figure 2 is an enlarged view, partly in section, of the mounting studs shown in Figure 1.

Figure 3 is a view similar to Figure 1 but showing a modified form of the internal parts and of the structure by which the parts are flexibly mounted within the casing.

Figure 4 is a transverse sectional view of still another modified form of the improved instrument.

Referring more particularly to Figures 1 and 2, reference numeral 1 designates a cylindrical casing which may be made of metal, such as aluminum, or of a phenolic condensation product such as Bakelite, or any other plastic material. The casing takes a cup-shaped configuration with a closed bottom portion, indicated at 2, and is provided at the open top edge with outwardly extending flange portions 3 to facilitate mounting the casing on a panel or switchboard. The interior of the casing, at its upper edge, is tapered as indicated at 4, for purposes which will be explained hereinafter. The movement or the internal parts of the instrument may comprise a laminated iron magnet structure 5, usually C-shaped and its supporting elements the open ends of the structure terminating in arcuate surfaces indicated at 6, in order to receive the rotating portion of the instrument.

This portion may comprise a stationary core member 7 and a coil of wire 8 which is adapted to rotate about the core. The coil of wire is rotatably carried at the top on a shaft 9 which is journalled in a jewel bearing indicated at 10 and is provided with a pointer 11 (Figure 4). At a position below the pointer 11 the shaft 9 is provided with a T-shaped element the legs of which terminate in counterweights 12. A hair spring 13 is secured to the shaft 9 to give the shaft and its coil a biased position of rotation, and also serving to conduct current from the source of supply to rotate the coil 8. The jewel bearing 10 is supported in a truss element 14 which extends transversely of the casing, and is bolted as indicated at 14', or otherwise secured to a plate 15 of insulating material. The latter is carried on the magnet assembly 5. The lower end of the shaft 9 is supported in a jewel bearing which is carried on a transversely extending truss 16, the parts of which may be removed by loosening the screws 17, as is well known in the art.

The magnet assembly 5 is supported above the bottom 2 of the casing by means of a pair of studs 18, threaded at the lower end and being provided with an enlarged portion 19 (Figure 2) at the position where the studs are secured to the magnet assembly. These studs extend through openings 20 in the bottom plate 2, these openings being of greater size than the studs. In accordance with the present invention, these studs are flexibly mounted within the plate 2 by means of grommets 21, preferably made of soft rubber or other highly elastic material. The grommets are provided with rounded edges, as indicated at 22, and also a peripherally extending groove 23 which fits snugly around the openings 20 in the bottom plate to leave a portion extending on both sides of the plate, as shown in Figure 2. Thus the grommets 21 are securely held in position. A sleeve 24 of any suitable metal or insulating material, may be inserted between the unthreaded portion of the stud 18 and each grommet. In order rigidly to secure the studs to the bottom plate, a washer 25 is placed over each stud immediately adjacent the lower surface of the grommet, and a nut 26 serves to clamp the shoulder 27 against the grommet so that each stud is not only securely held to the bottom plate but there is a predetermined thickness of the grommet material between all parts of the stud and the bottom plate. An electrical connector or wire 28 may be secured to each stud, the connector being held in position by a nut 29, shown more clearly in Figure 2. Thus the entire lower end of the internal structure of the instrument is supported on the studs 18, and inasmuch as the latter are held by means of elastic grommets to the bottom casing, the movement as a whole is flexibly mounted on the casing. It is also apparent that the grommets 21 serve the additional purpose of insulating the studs from the bottom portion 2 of the casing in the event the latter is made of metal.

A dial plate 30 is secured to support plate 15 by means of bolts 31, this dial plate carrying a dial 32 over which the pointer 11 is adapted to move when the coil 8 is energized by current through suitable connections which terminate at the studs 18. Immediately above the dial plate 30 there is a protective glass plate 33. A bezel 34 is interposed between the peripheries of the two plates and the tapered surface 4 of the casing 1. This bezel preferably is in the form of a ring of soft rubber or other flexible material, and is provided with a pair of parallelly positioned internal grooves of a width snugly to receive the dial plate 30 and the protective or covering plate 33. The bezel 34 may be fabricated as a preformed continuous ring, in which case the ring is stretched in order to position the dial plate and the cover plate within the ring so that as the nuts 26 of the studs 18 are tightened the entire movement, including the magnet assembly, is drawn within the casing and held firmly but flexibly in position. The bezel 34 may be provided with a shoulder 35 which seats itself against the upper surface of the flange portion 3 of the casing when the movement has been drawn into its proper position within the casing. The bezel as shown preferably takes a semi-circular shape at its outer edge for ornamentation purposes, and the interior surface may be tapered so as to permit the groove in which the dial plate 30 fits to be relatively shallow. Instead of providing the bezel 34 as a continuous ring, it may take the form of a strip which is wound around the edges of the dial and cover plate so that it will effect a cylindrical shape when the movement is drawn into the casing, as explained above.

Assuming that the magnet assembly 5 is of smaller size than the interior of the casing, it is apparent that the upper portion of the entire movement, including the magnet assembly, is flexibly mounted within the casing by the bezel 34, the latter serving the same purpose as the grommets 21. Thus the complete internal structure of the instrument is entirely shock-proof or floatingly mounted within the casing and yet there is very little, if any, relative movement between the internal parts and the casing. Any jar or vibration originating external of the casing is deadened or absorbed by the rubber bezel 34 and grommets 21 before it can reach the delicate moving parts within the casing, so that the instrument made in accordance with this invention necessarily has a long operating life. In addition to providing a flexible mounting for the interior parts, the bezel 34 and the grommets 21 positively prevent any passage of dust, dirt or moisture into the interior of the casing, and due to their flexible character almost any amount of pressure may be applied at the nuts 26 without causing actual damage to any of the internal parts, for example, the dial plate or the glass cover plate 33. As was also pointed out hereinbefore, the rubber bezel and grommet elements additionally serve to electrically insulate any of the internal metal parts from the casing, thus reducing any tendency to short-circuit or ground the electrical connections.

The instrument shown in Figure 3 is somewhat similar to that described in connection with Figure 1 except that the dial plate and glass cover plate are not supported on a common rubber bezel. Instead there is a rubber ring 36, preferably of circular cross section, which surrounds the periphery of the dial plate 30 and contacts the interior surface of the casing 1. The cover plate 33 is supported on a ledge 37 which may be secured to the side of the casing, as shown, and the casing is provided with an inwardly extending flange 38 against which the glass cover plate may abut. The lower part of the casing 1 may be formed as a closure plate 39, cemented or otherwise secured to an annular groove 40 provided at the lower end of the casing. As in the case of Figure 1, the movement shown in Figure 3, including the laminated magnet assembly, is carried on the studs 18 which are flexibly and insulatingly positioned in openings provided in the closure plate by means of the rubber grommets 21. It is apparent that all of the internal elements shown in Figure 3 are flexibly mounted within the casing by means of the rubber ring 36 and the rubber grommets 21 so that the instrument movement cannot be deleteriously affected by jar or vibration originating external of the casing.

Figure 4 shows still a different form which the improvement in the instrument mounting may take. A casing may be employed similar to that shown in Figure 3, in which the glass cover plate is held in position by the ledge 37 and the flange portion 38. Instead of employing a rubber ring around the dial plate 30, the outside surfaces of the magnet assembly are caused to contact rubber inserts 41, spaced equi-distantly around the interior of the casing. These inserts may be securely held to the casing by being fitted within longitudinally extending grooves in the casing and are preferably cemented in position. If desired, these grooves may be cut wedge-shape in order to receive a similarly shaped tongue provided on the rubber inserts. It will be understood in Figure 4 that the lower end of the instrument movement is carried on studs provided with rubber grommets similar to the structure shown and described in connection with Figures 1, 2 and 3. The innermost surfaces of the rubber elements 41 may be cut to an arcuate shape in order to provide as much as possible a line contact with the exterior surface of the magnet assembly, and it will be understood as many of these rubber inserts may be employed as are necessary, although in general three inserts will suffice, as shown in Figure 4. The improved structure shown in Figure 4 provides a flexible or rubber mounting for the interior unit as a whole, and the grommets which surround the support studs prevent the entry of any moisture or other foreign matter into the casing, as well as insulating the studs from the casing in the event that the casing is made of metal.

It will be understood that I desire to comprehend within my invention such modifications as come within the scope of the claims and the invention.

Having thus fully described my invention, what I claim as new and desire to secure by Letters Patent is:

1. An electrical measuring instrument comprising a casing containing an instrument assembly movement, a pointer, a dial for the instrument said movement being mounted on one end of the casing by studs which pass through openings in the casing, flexible material positioned at said openings between each of said studs and the casing, and flexible material positioned between the periphery of the dial and the interior of the casing.

2. An electrical measuring instrument comprising a metal casing having upper and lower portions containing an instrument movement, a dial for said movement positioned adjacent to the upper portion of said movement and a magnet assembly, means including metal studs forming a portion of said movement projecting through openings in the lower portion of said casing for supporting the movement within the casing, grommets which serves as an electrical insulator and as a flexible spacer positioned between each of said studs and the casing at said openings, and resilient means positioned between the upper portion of said movement and said casing.

3. An electrical measuring instrument comprising a casing containing an instrument movement, a pointer dial for said movement and a magnet assembly, means for flexibly mounting said assembly within the casing, said means comprising a plurality of rubber supports which are interposed between the outer surface of the magnet assembly and the interior surface of the casing.

4. An electrical measuring instrument comprising a casing containing an instrument movement, a pointer dial for said movement and a magnet assembly, means for flexibly mounting said assembly within the casing, said means comprising a plurality of rubber supports which are interposed between the outer surface of the magnet assembly and the interior surface of the casing, said movement being supported on the bottom of the casing on studs which extend through openings in the casing, and annular rubber grommets interposed between each stud and the casing at said openings, whereby the movement is flexibly supported in the casing at the position of the magnet assembly and also at the position where the studs emerge from the casing.

RAY L. TRIPLETT.